Aug. 30, 1932.  L. S. PECK  1,875,130
REDUCING BUSHING
Filed Sept. 24, 1928
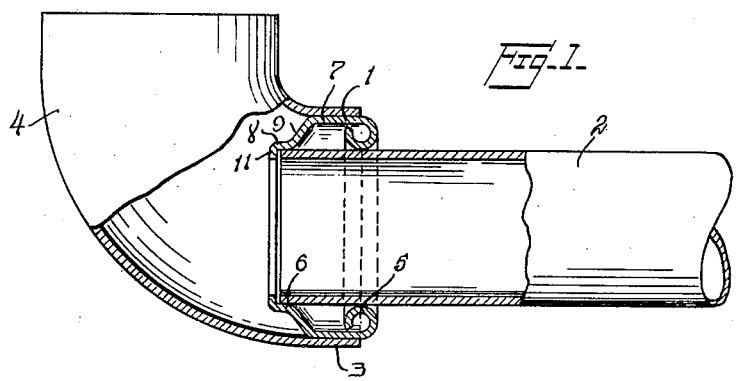
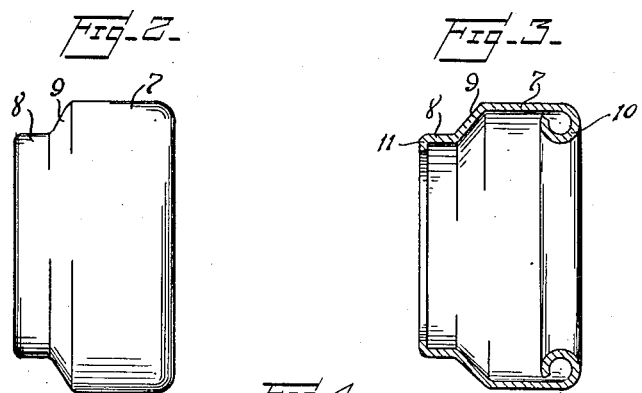
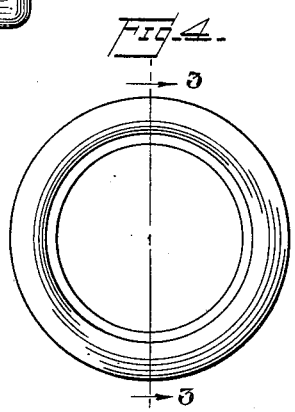
INVENTOR
Lionel S. Peck
BY
Lewis, Hudson and Kent
ATTORNEY Patented Aug. 30, 1932

1,875,130

UNITED STATES PATENT OFFICE

LIONEL S. PECK, OF MACEDONIA, OHIO, ASSIGNOR TO THE EATON MANUFACTURING COMPANY, OF CLEVELAND, OHIO, A CORPORATION OF OHIO

REDUCING BUSHING

Application filed September 24, 1928. Serial No. 307,920.

This invention relates to bushings and more particularly to a bushing of the type known as a reducing bushing which may be used for connecting a heater to the exhaust pipe of an automobile and for analogous purposes.

As is well known there is considerable variation in the sizes of exhaust pipes with which different makes of automobiles are equipped, and to manufacture and stock automobile heaters of various sizes corresponding to the various exhaust pipe sizes has heretofore necessitated an excessive outlay for manufacturing equipment and materials. Accordingly, it has been found desirable to manufacture the heaters with a standard size connection, and to manufacture and stock for use with such heaters reducing bushings or adapters of various sizes coresponding to the various exhaust pipe sizes. A bushing of this type is disclosed in this application.

An object of this invention is to provide a reducing bushing adapted for use in connection with automobile heating apparatus.

Another object of this invention is to provide a reducing bushing which can be easily and quickly secured in place.

A further object of this invention is to provide a reducing bushing which may be formed from sheet metal or seamless tubing.

Still another object of this invention is to provide a reducing bushing which will be very light, very rigid, and extremely durable and which can be cheaply manufactured.

Other objects and advantages will appear hereinafter.

In the drawing forming a part of this application.

Figure 1 is a side elevational view, partly in section, illustrating an application of the device.

Fig. 2 shows a side elevational view of the device.

Fig. 3 shows a sectional view of the device taken on line 2—2 of Fig. 4; and

Fig. 4 is an end elevational view of the device.

In the arrangement shown in Fig. 1, the bushing 1 is shown mounted on the end of a portion of an automobile exhaust pipe 2, and serves to establish a connection between the exhaust pipe 2 and the cylindrical portion 3 of the elbow 4 which leads to an automobile heater (not shown).

The bushing, as shown, comprises a cylindrical end portion 7 of relatively large diameter and a cylindrical end portion 8 of relatively small diameter, and a tapering portion indicated at 9 connecting the end portions. As shown in Fig. 3, the free end of the portion of large diameter terminates in an inturned bead indicated at 10. The cylindrical portion of small diameter, indicated at 8, terminates in a short radially extending inturned flange designated 11. It will be noted that the internal diameter of the bead 10 is approximately the same as the internal diameter of the constricted cylindrical portion 8.

The internal diameter of both the cylindrical portion 8 and of the bead 10 is formed slightly smaller than the external diameter of the pipe upon which the bushing is to fit. When the bushing is installed it is driven on the end of the pipe so that the cylindrical portion 8 and the bead 10 swage down and tightly engage the external surface of the pipe while flange 11 abuts against the squared end of the pipe. This swaging action produced by driving the bushing on the pipe results in a rigid and gas-tight connection between the bushing and the pipe. The bead 5 and the constricted cylindrical portion 8 engage the pipe so tightly that the bushing will remain securely in place without jarring loose, and all leakage of gases from the exhaust pipe at this joint will be prevented.

It is to be remembered that where fittings are used in connection with pipes carrying exhaust gases from internal combustion engines, these fittings are subjected to very high temperatures and to very sudden temperature changes, making it difficult to secure a reliable connection between such fittings and the exhaust pipe without the use of screw threads or a heat resistant packing substance. To make such screw threaded or packed fittings it has been necessary heretofore to make the fittings in the form of castings which are heavy and expensive to manufacture.

The bushing herein disclosed is formed in suitable dies from sheet metal or seamless tubing. The bushings so produced are light, strong, of great uniformity and can be easily and quickly installed. In providing such a bushing having a drive fit with the end portions of an exhaust pipe a rigid and leakproof connection is assured. Thus those skilled in the art to which the invention appertains will readily appreciate that the invention overcomes many objectionable features heretofore encountered.

While the bushing herein disclosed is intended primarily for establishing a connection between a portion of the exhaust pipe of an automobile engine and heating apparatus intended for use in heating automobiles, it is to be understood that the device may readily be employed in establishing a reliable connection between conducting members used for any desired purpose.

While I have shown an elbow mounted on the bushing herein disclosed, this is illustrative only since a heater valve, a T, or any other such fitting might be substituted therefor without departing from the spirit of my invention.

It is to be understood that the invention herein disclosed is not limited to the particular embodiment illustrated and described, but includes such modifications thereof as fall within the scope of the appended claims.

I claim as my invention:

1. In combination with the exhaust pipe of an internal combustion engine, a bushing having a bead formed on one end in contact with the outer periphery of said pipe and at its other end said bushing having a portion of reduced diameter tightly engaging said pipe near the end thereof and terminating in an internal radially extending flange adapted to abut against the end of said pipe.

2. In combination with a pipe for conducting a fluid, a bushing adapted to be driven on the end of said pipe to thereby provide sealing engagement between said bushing and the peripheral surface of said pipe, said bushing being provided at one end thereof with an internal bead and at the other end thereof with a portion of reduced diameter, the reduced portion and said bead being formed with an internal diameter which is slightly smaller than the external diameter of the pipe, whereby the reduced portion and said bead tightly engage the pipe when the bushing is driven thereon.

3. A reducing bushing comprising a continuous metallic sleeve having an internal bead of substantially circular cross-section formed on one end, and a cylindrical portion of reduced diameter formed on the other end of said sleeve, said portion of reduced diameter terminating in a radially extending inturned flange.

4. A reducing bushing comprising a cylindrical sleeve having portions of unequal diameter and including a portion of large diameter adjacent one end and a portion of smaller diameter adjacent the other end, the portion of large diameter having an inwardly extending bead thereon, the diameter of the opening surrounded by said bead being substantially the same as the internal diameter of the portion of smaller diameter, said portion of smaller diameter having an internally extending flange thereon adjacent the end of the bushing.

In testimony whereof, I hereunto affix my signature.

LIONEL S. PECK.

CERTIFICATE OF CORRECTION.

Patent No. 1,875,130.                                                                             August 30, 1932.

LIONEL S. PECK.

It is hereby certified that the name of the assignee in the above numbered patent was erroneously described and specified as "The Eaton Manufacturing Company", whereas said name should have been described and specified as Eaton Manufacturing Company, as shown by the records of assignments in this office; and that the said Letters Patent should be read with this correction therein that the same may conform to the record of the case in the Patent Office.

Signed and sealed this 22nd day of November, A. D. 1932.

(Seal)                                                                     M. J. Moore,
Acting Commissioner of Patents.